Aug. 4, 1936.  A. WHITE  2,050,142
PROPELLER
Filed July 10, 1935
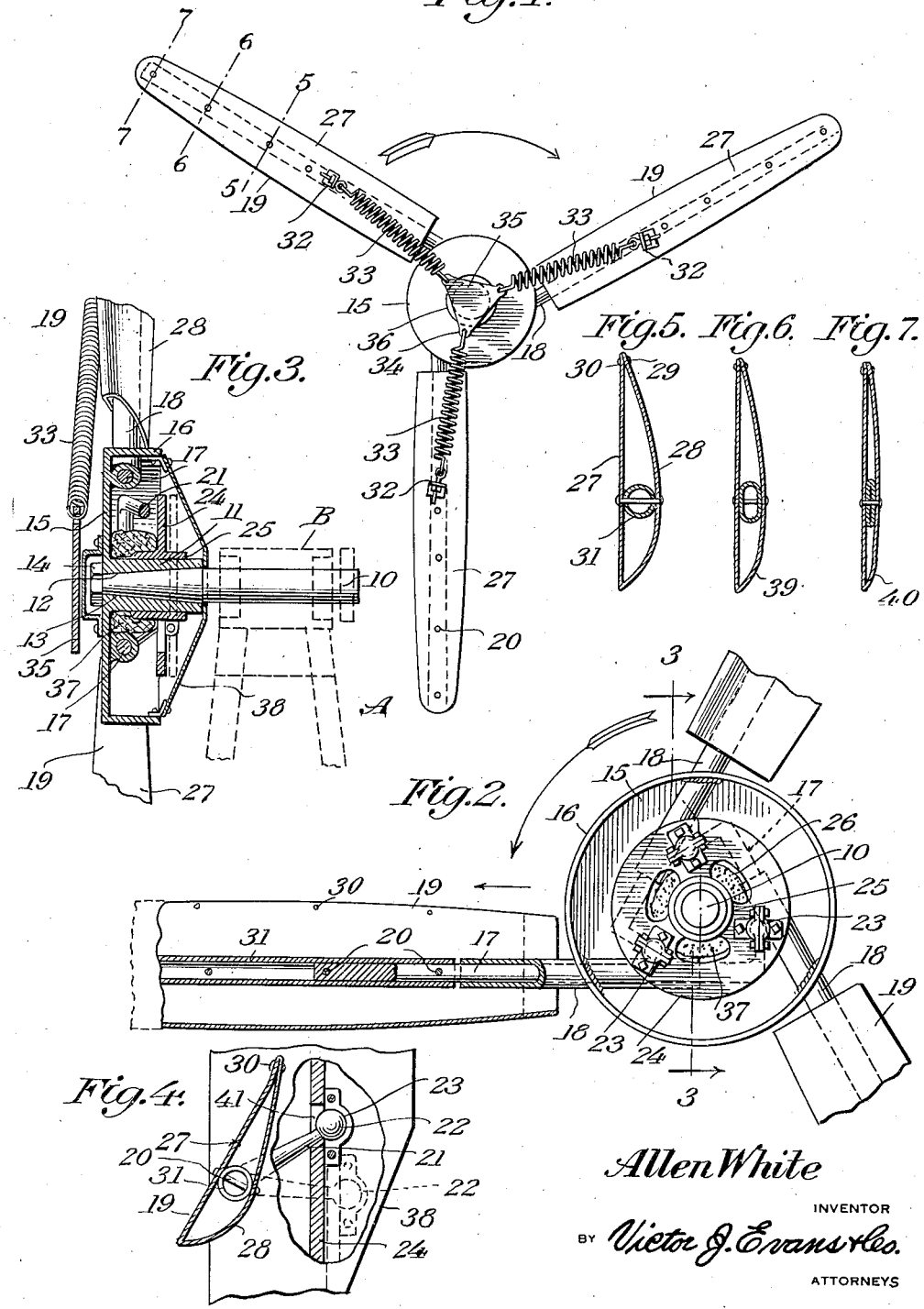
Allen White
INVENTOR
BY Victor J. Evans & Co.
ATTORNEYS Patented Aug. 4, 1936

2,050,142

UNITED STATES PATENT OFFICE 2,050,142

PROPELLER

Allen White, Newton, Kans.

Application July 10, 1935, Serial No. 30,699

1 Claim. (Cl. 170—68)

The invention relates to a propeller and more especially to self-regulating wind wheels or propellers.

The primary object of the invention is the provision of a wheel or propeller of this character, wherein the pitch of its blade is automatically regulated by the centrifugal force in the operation of such wheel or propeller, the latter being usable for the driving of a generator for the production of electricity for farm lighting and power.

Another object of the invention is the provision of a wheel or propeller of this character, wherein the blades as well as the structure in its entirety are made from metal, thereby assuring longevity in the use of such wheel or propeller.

A further object of the invention is the provision of a wheel or propeller of this character, wherein the construction thereof is novel in form so that its blades will be self-regulating for varying the pitch thereof in the working of the wheel or propeller.

A still further object of the invention is the provision of a wheel or propeller of this character, which is simple in its construction, automatic in the working thereof, thoroughly reliable and efficient in operation, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a front elevation of a wheel or propeller constructed in accordance with the invention.

Figure 2 is a rear elevation showing one of the blades partly in section.

Figure 3 is a sectional view on the line 3—3 of Figure 2 looking in the direction of the arrows.

Figure 4 is an enlarged end elevation partly in section looking toward one of the blades of the propeller.

Figure 5 is a sectional view on the line 5—5 of Figure 1.

Figure 6 is a sectional view on the line 6—6 of Figure 1.

Figure 7 is a sectional view on the line 7—7 of Figure 1.

Similar reference characters indicate corresponding parts throughout the several views in the drawing.

Referring to the drawing in detail, A designates generally a portion of a stand or upright support, it being of conventional kind and has provided at its upper end or built into the same a bearing B for an axle or shaft 10 which is adapted to carry the wheel or propeller constituting the present invention and hereinafter fully described.

The wheel or propeller comprises a hub 11 of metal having a tapered center bore 12 for accommodating a similarly tapered outer end 13 of the axle or shaft 10 and this hub is made fast upon the axle or shaft by a nut 14 threaded upon the outer end of the latter. The hub is formed at its forward end with a circular body portion or disk-like head 15 having marginally thereof a rearwardly bent annular flange 16. Extending through suitable clearances provided in the flange 16 are angularly disposed arms 17, these turnable in tubular housings 18 as fitted within the flange 16 and beyond these housings the arms 17 fit with blades 19 which are made fast by cross securing pins 20.

The arms 17 are formed with angle inner ends that afford cranks 21 having ball terminals 22, these being loosely engaged in socketed companion bearings, each in two parts or sections 23 secured to a floating disk 24 having a sleeve center 25 loosely embracing the hub 11. This sleeve 25 is rotatable and slidable longitudinally of the said hub 11 under centrifugal action of the wheel or propeller. The ball terminals 22 engaging the bearings 23 effect a universal joint connection between the cranks 21 of the arms 17 and the said disk 24. The disk 24 is slotted at 26 to reduce the weight thereof, it being made from metal.

Each blade 19 is formed with a flat side 27 and an arched opposite side 28, these sides being bent from a single piece of material with the meeting free edges 29 united by brazing or welding 30. The arm 17 at that portion fitted with its blade 19 is received in a tubular longitudinal brace 31 which extends throughout a major portion of the length of the blade and is intermediate of its leading and heel edges, the brazed or welded edges 30 being at the heel side of the blade.

The blades carry brackets 32 to which are connected coiled tensioning springs 33, these being connected to the corners 34 of a triangular shaped connector or tie plate 35 which is arranged forwardly of the hub 11 and next to a cap 36 mounted on the head 15 and concealing the nut 14 which makes fast the hub 11 upon the axle or shaft 10. These springs 33 cooperate with each other to have the blades 19 normally face the wind at the sides 27 thereof, the wheel or propeller being wind driven and through the axle or shaft 10 will furnish power for the driving of machinery or the like.

Under the wind action the wheel or propeller will be self-adjusting to alter the pitch of the blade 19 thereof, as the greater portion of the working face 27 is to the rear of the axis 31, which causes the rear portion to yield and present less surface of the blade to the wind as the wind increases. The centrifugal force will cause the opposite rotation and thereby tend to rotate the blades into the plane of revolution and thus present more surface of the blades to the wind. Also the angle between the spring and the axis 31 and the eccentric attachment of the springs and brackets 32, will determine the rotation of the blades on their axes. Thus the blades 19 under adjustment will simultaneously alter their pitch uniformly with each other by reason of the hook-up of the cranks 21 with the disk 24.

Located between the head 15 and the disk 24 is a lubricant soaked filling of fibrous material 37 which when compressed by the shifting of the disk 24 on the hub 11 will lubricate the parts adjacent to said filling 37 for the smooth operation of the wheel or propeller. Connected with the flange 16 and the hub 11 rearwardly of the disk 26 are braces 38 which maintain the blades in their radially disposed relation to each other and to the hub 11 and the head 15 to withstand impact of wind currents during the operation of the wheel or propeller.

In Figures 5, 6 and 7 of the drawing the gradual change in the shape of each blade is clearly disclosed at different points of the blade throughout the length of the same with the advance edge of said blade gradually rounding as at 39 and 40. The wheel or propeller constituting the present invention in its build is preferably made entirely of metal so as to give longevity thereto in the use of the same. The blades of the wheel or propeller are very sensitive to wind current and their pitch will be altered by centrifugal force for the proper working of the wheel or propeller.

The disk 24 has the cut away portions 41 for the cranks 21 which extend into the bearings 23 for the universal or ball joint connections of said cranks with the disk as is clearly shown in Figure 4 of the drawing.

What is claimed is:

In a propeller of the class described, a hub having a hollow head surrounding the same, a plurality of tubes welded to and extending inwardly and outwardly beyond the head, a disk slidably mounted on the hub and provided with a plurality of sockets, blades, rods to which the blades are connected adjustably secured in the tubes but fixed thereto, and said rods having angle ends terminating in ball heads which are received in the sockets and a coiled tension spring between each blade and the outer face of the hub.

ALLEN WHITE.